Figure 1:
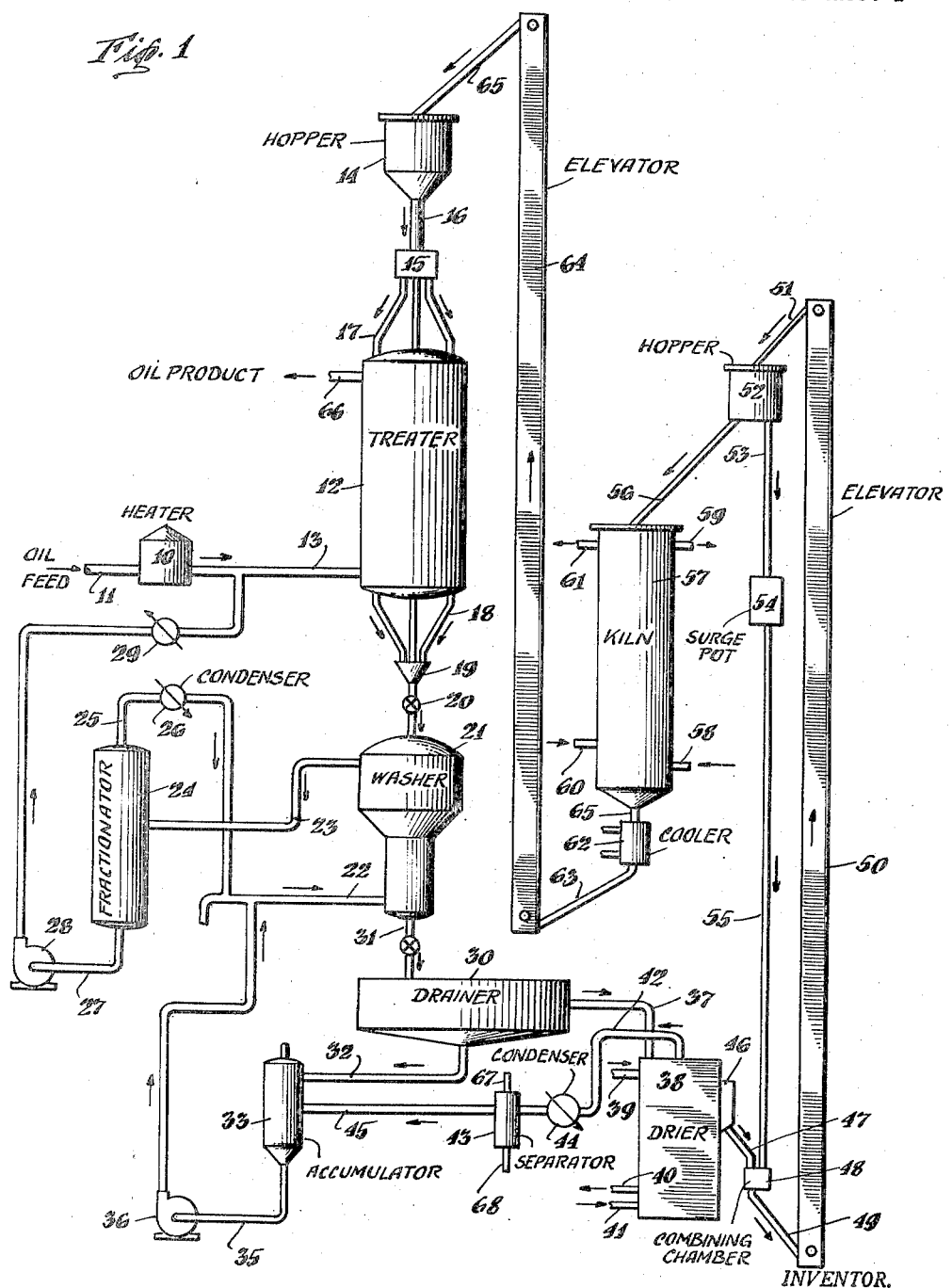

May 31, 1955  E. V. BERGSTROM  2,709,674
DRYING OF ADSORBENT SOLIDS
Filed March 22, 1952  5 Sheets-Sheet 1

INVENTOR.
Eric V. Bergstrom
BY
Andrew L. Jabouriault
AGENT

May 31, 1955  E. V. BERGSTROM  2,709,674
DRYING OF ADSORBENT SOLIDS
Filed March 22, 1952  5 Sheets-Sheet 5

INVENTOR.
Eric V. Bergstrom
BY
Andrew L. Jabonault
AGENT

United States Patent Office 2,709,674
Patented May 31, 1955

2,709,674

DRYING OF ADSORBENT SOLIDS

Eric V. Bergstrom, Short Hills, N. J., assignor to Socony Mobil Oil Company, Inc., a corporation of New York Application March 22, 1952, Serial No. 278,059

11 Claims. (Cl. 196—147)

This invention pertains to a continuous process for treating liquids with granular adsorbent solids and relates particularly to a method and apparatus for drying the used adsorptive solids in such a process before the used solids are regenerated.

Typical of the processes to which this invention applies is the treatment of liquid mineral oils with a granular adsorbent solid for the purpose of removing color bodies, gum-forming compounds and other impurities from the oil.

In an important commercial process of the above type, a bed of granular adsorbent contact material is gravitated downwardly through a contacting zone and liquid oil flows upwardly through the bed to effect the desired treating. The contact material is contaminated by carbonaceous contaminant deposits of the types previously mentioned and must therefore be reconditioned before it can be reused in the contacting zone. The reconditioning is effected in a separate regeneration zone wherein the used contact material is contacted with an oxygen-containing gas such as air to remove the contaminants by burning. Used contact material from the treating zone will ordinarily have a considerable amount of liquid oil adhering thereto. It is economically necessary that this oil be recovered from the contact material before it is passed to the regeneration zone. For this reason the used contact material is usually washed with a suitable solvent, such as naphtha, which will remove the liquid oil from the contact material. The liquid oil may then be recovered from the solvent by distillation. It is not desirable to pass the washed contact material directly to the regeneration zone since, even after draining the contact material, a considerable quantity of solvent remains on the contact material. If the contact material were regenerated in this condition it would result in loss of the solvent through burning in the regeneration zone and the contact material might be permanently damaged due to overheating since the burning of the solvent tends to increase the contact material temperature in the regeneration zone. It is therefore, desirable to dry the contact material before passing it to the regeneration zone. It is further desirable to seal the drier from the regenerating zone and from the conveying means for transporting the contact material from the drier to the regeneration zone in order to prevent escape of solvent to the atmosphere or to the kiln. Gas tight star valves and other sealing valves employed alone or with pressure pot systems have been employed in the past for effecting removal of granular material from contacting zones without escape of contacting gas but such systems have the disadvantage of causing excessive catalyst attrition, involving severe erosion of the moving valve and of generally requiring complicated cycle timing systems.

An object of this invention is to provide an improved method and apparatus for drying the contact material used in processes of the above-described type.

Another object of this invention, is the provision of an improved method and apparatus for removal of dried adsorbent from the drying zone to a conveying zone and to a regeneration zone continuously and without escape of gases from the drier into the conveying and regeneration zone.

These and other objects of the invention will become apparent from the following discussion of the invention.

This invention involves a drier in which a bed of the granular contact material to be dried is maintained in a state of ebullient motion which resembles a boiling fluid within the lower section of the drier by the passage of inert gas, such as steam or flue gas, upwardly through the drier and by vaporization of the solvent on the contact material. Heat is supplied to the bed by indirect heat exchange with a suitable heat transfer fluid. A stream of dried contact material is withdrawn from the upper section of the bed and passed to a confined combining zone and onto the surface of a bed of contact material therein. A stream of contact material is withdrawn from the lower section of the combining chamber at a rate greater than the rate at which contact material enters the combining chamber from the drying chamber. This stream passes downwardly as a compact column of sufficient length to prevent the transfer of gaseous material from the combining zone to the bottom of a conveying means into which the stream is discharged. Contact material passes upwardly by means of the conveying means to a level above the combining chamber and discharges into a supply chamber. A stream of contact material passes from the supply chamber to the regeneration chamber while a second stream of contact material passes from the supply chamber and is recycled to the combining chamber to make up the difference in flow between the stream withdrawn from the combining chamber and the stream entering the combining chamber from the drying chamber. The stream of contact material withdrawn from the combining zone is so placed that it preferentially draws contact material from the stream entering the combining chamber from the drying chamber. Thus only a flow equal to the difference between the flow rate of the stream withdrawn from the combining zone and the stream entering the combining zone from the drying zone occurs in the recycle stream in normal operation. In more preferred forms of this invention, however, the recycle stream is so placed that some flow always occurs therein regardless of the flow from the drying chamber.

Figure 2:
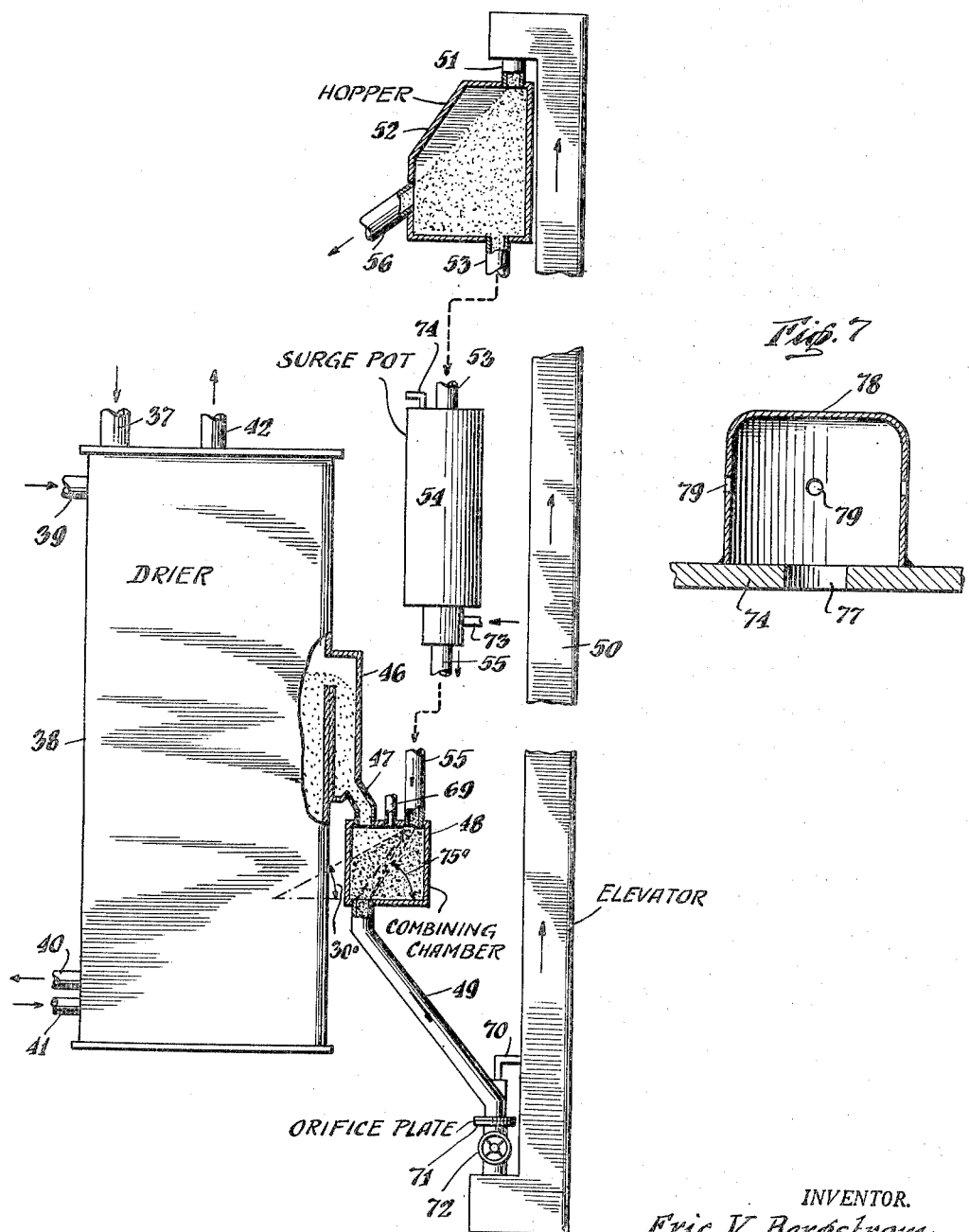
Figure 3:
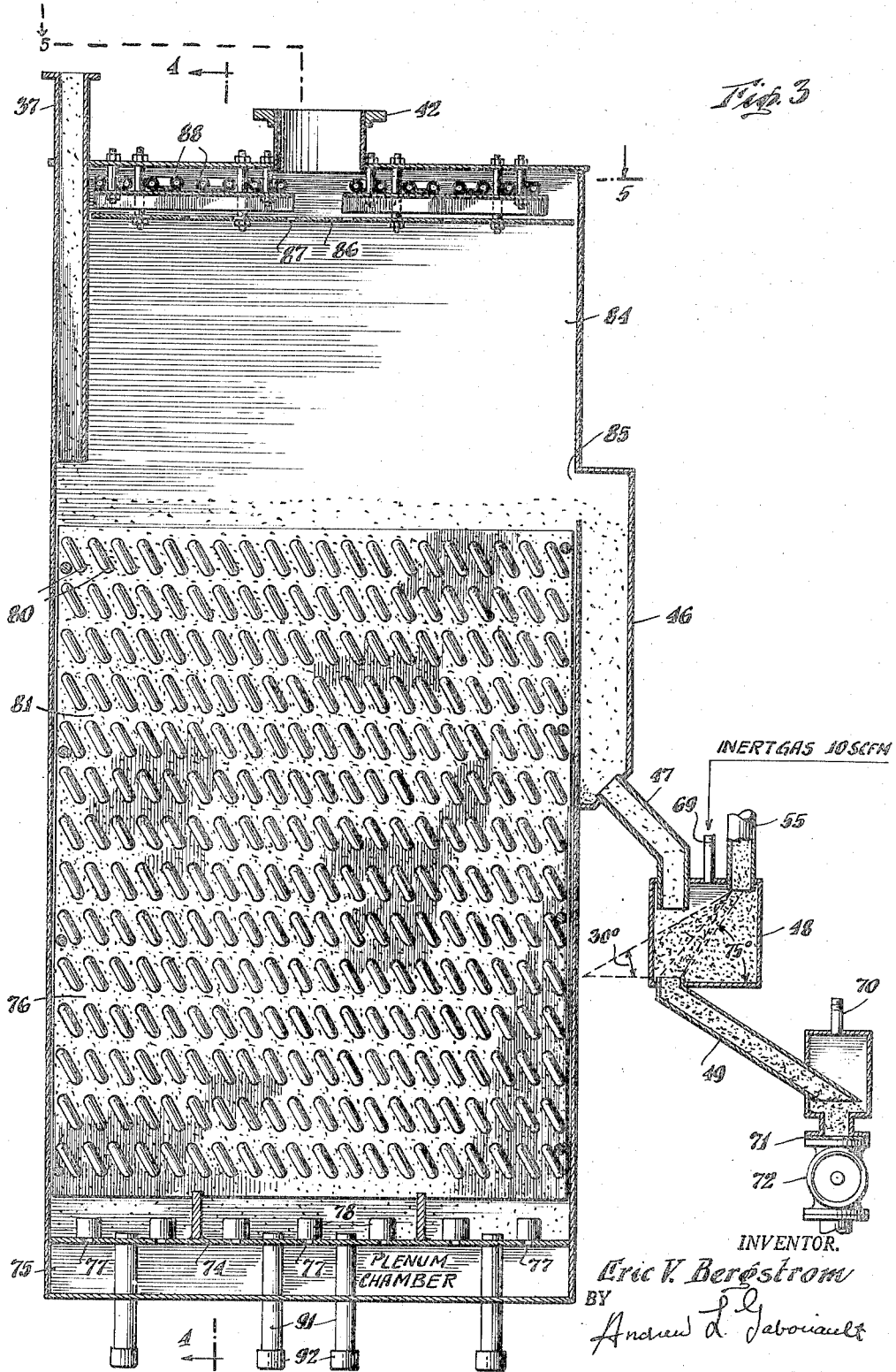
Figure 4:
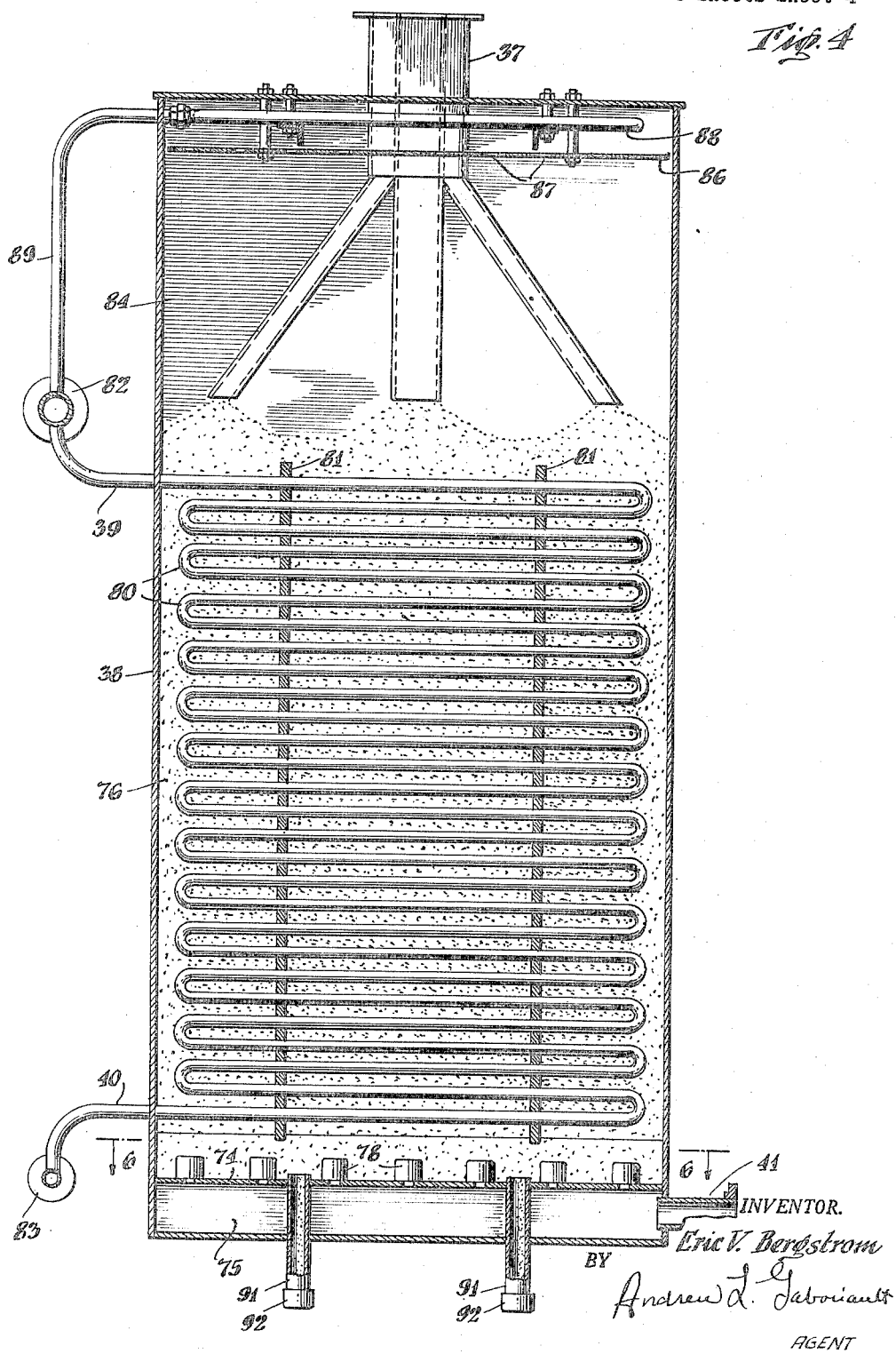
Figure 5:
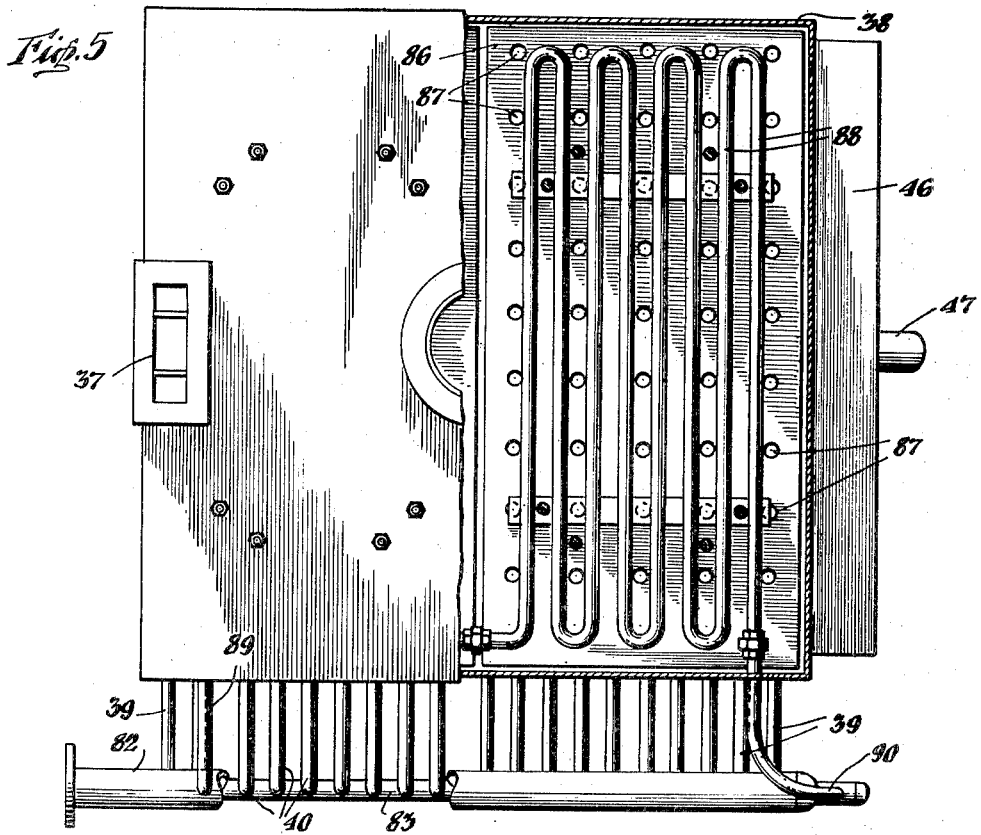
Figure 6:
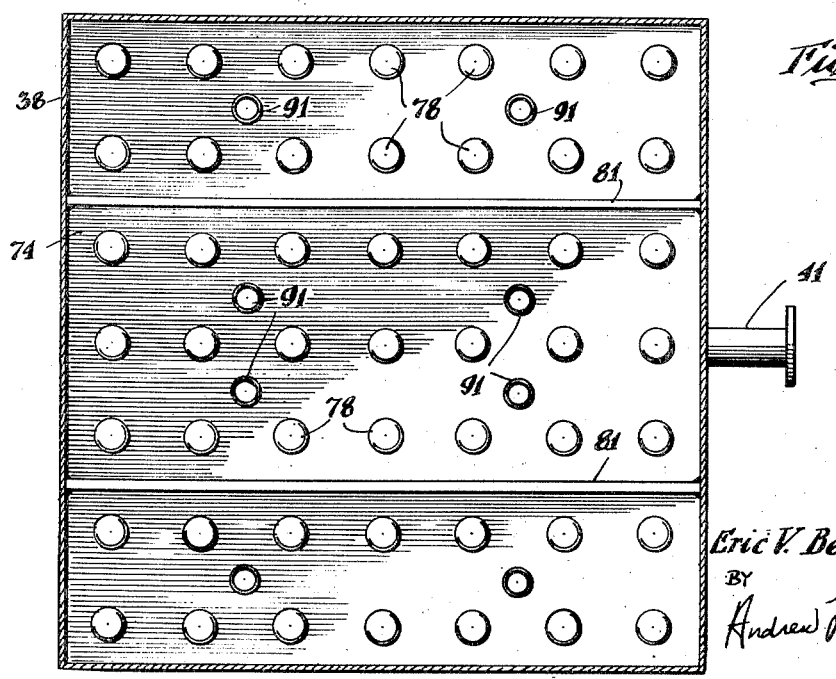

This invention will be more readily understood by reference to the attached drawings of which, Figure 1 is an elevational view showing the application of this invention to a continuous percolation process for the treatment of liquid mineral oils, Figure 2 is an elevational view, partially in section, showing the apparatus of this invention, Figure 3 is an elevational sectional view of the drying chamber of this invention, Figure 4 is a sectional view taken along line 4—4 of Figure 3, Figure 5 is a plan view, partially in section, along line 5—5 of Figure 3, Figure 6 is a sectional view taken along line 6—6 of Figure 4 and, Figure 7 is an elevational sectional view of the distributor for inert gas used in the drying chamber.

All of these drawings are diagrammatic in form and like parts in all the drawings bear like numerals.

Turning to Figure 1 there is shown a supply hopper 14 for granular adsorbent contact material which connects to a contact material distributor 15 by means of a conduit 16. A suitable contact material distributor is described and claimed in U. S. patent application, Serial No. 237,264, filed July 17, 1951. A plurality of conduits 17 extend from the bottom of distributor 15 to a plurality of horizontally spaced apart points within contacting vessel 12. An oil feed heater 10 is provided with an oil feed conduit 11 and connects by means of conduit 13 into the lower section of treating vessel 12. A plurality of used contact material withdrawal conduits 18 extend from the bottom of chamber 12 into a collector 19. Collector 19 connects by means conduit 20 to a solvent washing chamber 21. Vessel 21 is provided with a solvent inlet conduit 22 and a solvent outlet conduit 23. Solvent outlet conduit 23 is connected into a fractionator 24. Fractionator 24 has an overhead withdrawal conduit 25, with condenser 26 thereon, which connects into conduit 22, and a bottoms withdrawal conduit 27 which connects into conduit 13. Conduit 27 is equipped with a bottoms pump 28 and a heater 29. The lower section of washing vessel 21 connects into a contact material drainer 30 by means of a contact material withdrawal conduit 31. A solvent removal conduit 32 is provided in the bottom of drainer 30 and connects into a solvent accumulator 33. A withdrawal conduit 35, having pump 36 thereon, extends from the bottom of accumulator 33 to conduit 22. A contact material withdrawal conduit 37 extends from the end of drainer 30 into the upper section of drier 38. Drying vessel 38 is provided with heat transfer tubes (not shown in Figure 1) to which heat transfer fluid may be supplied by means of conduit 39 and withdrawn by means of conduit 40. An inert gas charge conduit 41 extends into the lower section of drying chamber 38. A withdrawal conduit 42 for vaporized solvent extends from the upper end of chamber 38 to separator 43. A condenser 44 is provided on conduit 42. A conduit 45 for solvent flow extends from separator 43 to accumulator 33. A contact material withdrawal duct 46 extends from one wall of vessel 38 and a conduit 47 extends from the bottom of conduit 46, into the upper section of combining chamber 48. Combining chamber 48 is provided with a seal conduit 49 extending to conveying or elevating means 50 which may take the form, for example, of a bucket elevator or gas lift. The upper end of 50 is connected by means of conduit 51 to a supply chamber 52. Conduit 53 extends from the bottom of vessel 52 to a surge pot 54 and conduit 55 extends from the bottom of surge pot 55 to combining chamber 48. A second conduit 56 extends from the bottom of chamber 52 into the upper section of regeneration vessel 57. Regeneration chamber 57 is provided with an inlet 58 for oxygen containing gas and an outlet 59 for flue gas. Heat transfer tubes (not shown) are provided within chamber 57 having an inlet conduit 60 and an outlet conduit 61. A regenerated contact material outlet conduit 65 extends from the bottom of vessel 57 to cooler 62 and cooler 62 connects, by means of conduit 63, to the bottom of elevating means 64. The top of elevator 64 connects to hopper 14 by means of conduit 65.

In operation granular adsorbent contact material gravitates from hopper 14 through distributor 15 and into the upper section of treating zone 12 by means of conduits 17. The adsorbent employed should be made up of palpable particles of size within the range about 4–100 mesh and preferably about 10–60 mesh and still more preferably 15–30 mesh by Tyler standard screen analysis. The particles may take the form of pellets, capsules, spheres, pills, tablets or the like or granules of irregular shape such as are obtained from grinding and screening. The terms adsorbent in palpable particulate form or palpable particle form adsorbents as employed herein in describing and claiming this invention are intended to cover generically particles of any or all of these shapes having substantial size as distinguished from finely divided powders. Typical adsorbents which may be used are fuller's earth, bauxite, bentonite and bone char, charcoal, magnesium silicate, heat and acid activated kaolin and activated carbon. The contact material passes through contacting zone 12 as a downwardly gravitating columnar mass. A liquid oil feed which may be, for example, a fuel oil or lubricating oil fraction of low asphalt content, passes to heater 10 through conduit 11 wherein the oil is heated to a suitable temperature for adsorbent contacting. The heated oil then passes into the lower section of contacting zone 12 and upwardly through the bed of contact material therein to effect the desired treatment. Typical of the purposes for which the treatment may be made are decolorization, neutralization, removal of suspended, colloidal or dissolved impurities such as carbon or coke or oxygen and nitrogen containing impurities and other gum forming compounds and improvement of the demulsibility properties of the oil. The treated oil is removed from treating zone 12 by means of conduit 66. The used contact material, containing organic contaminants gravitates from the bottom of contacting zone 12 to collector 19 through conduits 18. Used contact material passes from the collector by means of passage 20 into washing zone 21.

In the washing zone any liquid oil adhering to the contact material is removed by countercurrent contacting with a suitable washing solvent. Typical of suitable solvents are petroleum naphtha boiling within the range 100°–400° F., carbon tetrachloride, normal heptane, normal octane, and carbon disulfide. A paraffinic naphtha boiling within the range about 210–300° F. is generally preferable. Solvent is charged to the washing zone through passage 22 and used solvent, containing dissolved oil, is passed to fractionator 24 by means of conduit 23. In the fractionator, the solvent is stripped from the oil and returned to the washing zone by means of conduit 25 after condensing. The liquid oil is pumped from the bottom of fractionator 24 by pump 28 and added to the charge to the treating zone. The washed adsorbent having adhering solvent, is passed to draining zone 30 through conduit 31. Drainer 30 may consist of an endless, moving, porous belt through which the solvent drains. Solvent is removed from the draining chamber by means of passage 32 and passed to solvent accumulator 33 from which solvent is pumped by means of pump 36 to washing zone 21. The drained contact material, which still contains adhering solvent, is then passed to drying zone 38 through conduit 37. In the drying zone the contact material is freed of vaporizable constituents, mainly solvent by heating. Inert gas such as steam or flue gas is admitted to the lower section of the drier to fluidize and strip the contact material in the drier. Inert gas and vaporized solvent pass from the drying zone through condenser 44 to separator 43. In the separator inert gas which has not been condensed is removed through conduit 67. Any condensed material, other than solvent, is removed through conduit 68. Solvent passes from 43 to accumulator 33 through conduit 45.

Dried contact material passes from drying zone 38 through conduits 46 and 47 to combining zone 48. Contact material passes from the lower section of the combining zone by means of passage 49 at a rate greater than contact material enters through conduit 47 to an elevating means 50. Contact material is elevated to supply zone 52 by elevator 50. A stream of contact material is withdrawn from the lower section of the supply zone and passed to regeneration zone 57. A second stream of contact material passes to surge pot 54 through passage 53 and is then recycled into combining zone 48 by means of conduit 55 to make up the difference in flow through passages 49 and 47.

Contact material passes downwardly through regeneration zone 57 as a compact column and is reconditioned for reuse in contacting zone 12 by burning the non-vaporizable carbonaceous contaminants thereon with an oxygen-containing gas, such as air, admitted through conduit 58. Flue gas is removed through passage 59. The temperature of the contact material in reconditioning zone 57 is controlled below the level at which the contact material is permanently damaged by means of heat transfer coils (not shown). Other regeneration systems than that shown may be used. Regenerated contact material is cooled by cooler 62 to a temperature suitable for use in treating zone 12 and then elevated to hopper 14 by elevator 64.

Details of the sealing system for the drier are shown in Figure 2. Contact material duct 46 connects into drier 38 and duct or conduit 47 extends from the bottom of passageway 46 into the upper section of combining chamber 48. A contact material withdrawal conduit 49 extends downwardly from the lower section of chamber 48 into elevating means 50. The point of entry of conduit 49 to chamber 48 or the withdrawal aperture of conduit 49 is substantially directly below the point of entry of conduit 47 to chamber 48 or the discharge aperture of conduit 47. An inlet pipe 69 for inert purge gas is provided in chamber 48. Conduit 49 is of a length sufficient to provide a substantially compact column of contact material adequate to prevent the transfer of any excessive amount of gaseous material from the combining chamber to the elevating means through conduit 49. A by-pass for gas flow to the elevator boot is provided at 70 near the lower end of conduit 49 and a throttling orifice 71 is also provided in the lower section of conduit 49 below the by-pass 70. A valve 72 is positioned below orifice 71 to stop the flow through 49 when desired. Conduit 53 extends downwardly from supply chamber 52 to surge pot 54 and conduit 55 extends from the bottom of the surge pot to combining chamber 48. Supply chamber 52 need not be very great in volume since surge space is generally provided in the upper section of the regeneration chamber and surge pot 54 is provided in the recycle stream. In some applications chamber 52 may be eliminated entirely and pipe 53 connect directly into conduit 51 which will extend into regenerator 57. A seal gas inlet 73 is provided at the upper end of conduit 55 and surge pot 54 is vented by pipe 74. Conduit 55 should be of a length sufficient to provide a compact contact material column adequate to prevent the transfer of any substantial amount of gaseous material from chamber 48 to surge pot 54 through conduit 55. The discharge aperture of conduit 55 is laterally displaced from the withdrawal aperture of conduit 49 so that adsorbent preferentially flows to conduit 49 from conduit 47. Conduit 55 is so placed that an imaginary line connecting the nearest point of the discharge end of pipe 55 and the most remote point on the withdrawal end of conduit 49 is greater than the angle of repose of the adsorbent, whereby, even when no adsorbent is flowing from conduit 47, the flow from conduit 55 will form a bed covering the inlet to 49 and having a surface formed along the normal angle of repose of the adsorbent. The angle of repose varies from about 25 to 40 degrees with the horizontal depending on the adsorbent involved. It is important that under all conditions at least some adsorbent be continuously withdrawn from conduit 55. Otherwise the adsorbent will cool to low temperatures in conduit 55 which may permit steam condensation thereon. In order to insure continuous movement in conduit 55 at all times, its discharge end is so positioned that an imaginary line drawn from the nearest adjacent points on the ends of conduits 49 and 55 in chamber 48 forms an angle with the horizontal of slightly greater than the angle of internal flow of the adsorbent material. In less preferred forms of the invention this line may be less than the angle of internal flow as long as it is greater than the angle of repose. In such cases some flow from conduit 55 will take place at all times except when the flow from the drier temporarily exceeds the capacity of conduit 49. The angle of internal flow may be defined by imagining a plane surface supporting an infinite body of the material studied. Pierce a circular hole in the surface and allow the material to flow therethrough. Above the hole there will be a cone within which material moves to and through the hole, and outside of which material remains in place. The angle between an element of the cone and the horizontal is the angle of internal flow. The angle of internal flow will vary depending upon the physical characteristics of the adsorbent particles from about 65–80 degrees with the horizontal.

Details of the drier construction are shown in Figures 3, 4, 5, 6 and 7 and these figures will be considered together. A partition 74 extends transversely across the lower section of vessel 38, dividing the vessel into an inert gas plenum chamber 75 below the partition and a drying chamber 76 thereabove. Inert gas charge conduit 41 extends into plenum chamber 75. A plurality of orifices 77 pass through partition 74 to connect chamber 76 with chamber 75. A distributor cap 78 having a plurality of orifices 79 in its side is fixed over each of orifices 77. This distributor cap is shown in Figure 7. Throughout the lower section of drying chamber 76 are a plurality of banks of heat transfer tubes 80 held in position by tube sheets 81. These tubes are supplied heat transfer fluid, such as steam, through conduits 39 which are supplied from header 82. A plurality of heat transfer withdrawal conduits 40 extend from the opposite end of tubes 80 and connect into header 83. A disengaging space 84 is provided in the upper section of drying chamber 76. Wet contact material charge duct 37 extends into the upper section of drying chamber 76 along one wall of chamber 76 and terminates above heat transfer tubes 80. The lower section of duct 37 is split into three sections which terminate at horizontally spaced apart points in the same vertical plane. Extending across the wall of vessel 38 opposite the wall adjacent to duct 39 at a level above heat transfer tubes 80 is a slot type weir 85. Duct 46, adapted to receive contact material which flows over weir 85, is provided on the outside of vessel 38 as previously described. In the upper section of disengaging space 84 is fixed a baffle plate 86 having orifices 87 therethrough. A plurality of heat transfer tubes 88 are fixed between the upper end of vessel 38 and baffle plate 86. These tubes receive heat transfer fluid from header 82 through conduit 89 and discharge heat transfer fluid to header 83 through conduit 90. A vapor and gas outlet 42 extends from the upper end of vessel 38. A plurality of drain conduits 91 extend from the bottom of drying chamber 76 so that the chamber may be drained of contact material during shut down periods. These conduits are normally kept closed by caps 92.

In operation, an inert gas, such as steam or flue gas, enters plenum chamber 75 and passes into drying chamber 76 through orifices 77 and 79. A bed of contact material in a state of ebullient motion which resembles a boiling fluid is maintained within the lower section of drying chamber 76 and extends upwardly to a level just above heating tubes 80. The bed is maintained in this state of ebullient motion by the inert gas from plenum chamber 75 and by solvent vaporized from the contact material. Heat is added to the bed by heating tubes 80. Wet contact material, having non-vaporizable carbonaceous contaminants and vaporizable organic or hydrocarbon constituents, mainly solvent, deposited thereon, is charged through conduit 37. The solvent vaporized from the contact material and the inert gas pass into disengaging space 84 where contact material settles out of the gas. The orifices 87 in plate 86 impose a flow restriction on the gas flow sufficient to avoid channeling of gas flow which would otherwise occur due to the localized position of the gas outlet 42. The pressure drop across the orifices 87 is substantially greater than the sum of the pressure drops due to flow from the bed to the orifice and from above the orifices to the outlet 42. The gaseous material after passing through the orifices 87 passes over the bank of heat transfer tubes 88 whereby the gas is heated. This prevents condensation. The gaseous material discharges via conduit 42. The drier may be operated under any desired pressure below or above atmospheric but is usually operated at a pressure near or only moderately in excess of atmospheric pressure. Dried adsorbent flows over a slot type weir at the upper end of discharge duct 46 and flows downwardly as a freely falling discharge stream through discharge passage 46 at a rate sufficiently high to avoid filling the passage 46 with adsorbent. This is accomplished by withdrawing a drain stream of adsorbent through conduit 49 at a rate controlled by orifice 71 above that at which adsorbent enters duct 46. Thus flooding of the drier is avoided. The discharge stream falls onto a bed of adsorbent within confined zone 48.

A suitable inert purge gas such as flue gas is supplied to zone 48 via pipe 69 at a sufficient rate to maintain a slightly greater pressure in zone 48 than that in the upper portion of the drier. The term "slightly greater pressure" is used herein to mean a pressure about ¼ to ½ p. s. i. greater than the pressure in upper portion of the drier. Most of the inert gas passes upwardly through duct 46 so as to strip naphtha from the effluent adsorbent. This gas is withdrawn from the drier via conduit 42. The contact material passes from the lower section of zone 48 downwardly through 49 as a substantially compact columnar drain stream, the length of the stream being sufficient to prevent the escape of any excessive amount of gaseous material through the column from the combining zone. The small amount of gas which passes downwardly through conduit 49 from chamber 48 is vented from the upstream side of orifice 71 to the downstream side of the orifice or to the boot of elevator 50 via pipe 70 above the flow orifice 71. Thus the pressure is equalized across orifice 71 so that flow therethrough is not upset by pressure and gas flow fluctuations. Referring again to Figure 2, contact material is elevated to supply zone 52, at a location above regeneration zone 57, by means of conveyor 50. A stream of contact material passes from the lower section of supply zone 52 to the reconditioning zone through conduit 56. A recycle stream of contact material also gravitates from the supply zone through conduit 53 into surge pot 54. The recycle stream of contact material gravitates as a compact column from the lower end of surge zone 54 into combining zone 48 to make up the difference in flow ratio between the column withdrawn through 49 and the stream supplied through 47. The column within 55 should be sufficiently long to permit gravity flow into chamber 48 and of sufficiently restricted cross-section to impose a substantial resistance to gas flow therethrough. A second stream of inert purge gas is introduced into the upper end of conduit 55 via pipe 73 at a rate sufficient to maintain a slightly higher pressure at the upper end of conduit 55 than at the lower end thereof, whereby upward flow of gas from chamber 48 into chamber 54 is prevented.

In normal operation where the rate of flow through 49 is greater than the rate of flow through 47, contact material will be continuously drawn from conduit 55 and will continuously circulate through 52, 53 and 54. If for any reason the rate of adsorbent discharge through conduit 47 falls off or stops contact material will be drawn from 55 to make up the difference since the contact material from 55 naturally assumes the angle of repose which will cover the withdrawal aperture of 49 and since the size of conduit 55 is such as to have a maximum flow capacity greater than that permitted by the orifice 71 in conduit 49. Thus the seal provided by the column in 49 will remain unbroken even though there is no flow through 47. If the flow in 47 should increase above normal, this will be accompanied by an equal decrease in the flow from conduit 55 due to the preferential position of conduit 47. However since the orifice capacity is above the maximum expected flow from the drier, some flow will always occur from conduit 55. By maintaining a constant circulation through 53, 54 and 55, the catalyst is maintained in a heated condition therein, ready for use. If a stagnant column were maintained in these zones the catalyst would cool and disrupt operations in the regeneration zone when it were necessary to transfer it there.

The dimensions of the several parts of the drying and sealing system will, of course, be dependent on the throughput desired and the type of material being dried. In general, the drying vessel should be greater in height than in lateral dimensions. The drier should be sufficiently wide so that wet contact material entering through conduit 37 does not flow out through weir 85 before being dried. The temperature in the drying zone should generally be at a level sufficient to vaporize all of the vaporizable organic material on the contact material. In some applications it may be desirable, however, to limit the temperature to a value which will vaporize all of the solvent on the contact material but will not vaporize any other organic material, such as traces of liquid oil, which may be thereon because of the possibility of contaminating the solvent in the accumulator. In most instances, however, the amount of liquid oil on the contact material will be negligible after washing and it will be desirable to remove what does remain in the drier rather than placing an added load on the regenerator. It is generally desirable to maintain the temperature of the bed in the drier above about 350° F. In some cases it may be further desirable to operate the drier as a preheater for the regenerator. In these instances the temperature in the drier may be of the order of about 700° F. Normally however the drier temperature is considerably lower. As previously stated the rate of contact material withdrawal from chamber 48 through conduit 49 should be greater than the rate of contact material entering through conduit 47. Generally, the rate through conduit 49 should be about 15 per cent to 200 per cent and preferably 15 per cent to 50 per cent greater than the rate through 47. The pressure in the combining zone should be generally between ¼ and ½ pounds per square inch, greater than the pressure in the upper section of the drying zone.

As an example of a suitable construction of a drier according to this invention, a drier used in a continuous percolation process for treating liquid mineral oil will be described. Drying vessel 38 was 5 feet square and 10 feet 8 inches high. Plenum chamber 75 was 6 inches high. Heat transfer tubes 80 extended throughout the lower section of the drying chamber from a level 7½ inches above partition 74 to a level 6½ feet above 74. There were 560 such tubes. The top of weir 85 was 2 feet 10 inches from the top of vessel 38 and weir 85 was 5 inches high and extended across one side of vessel 38. Charge duct 37 extended into vessel 38 to a level 2 feet 10 inches below the top of 38, adjacent to the wall of 38 opposite weir 85. Baffle plate 87 was 6 inches from the top of 38. There were 49 orifices 77 equipped with caps 78 in plate 74. Combining chamber 48 was one foot high and 8 inches by 12 inches in lateral dimensions. Conduit 47 extended into chamber 48 vertically a distance of 3" from the top. Conduit 49 extended into the bottom of chamber 48 a distance of one inch and had a center line identical with conduit 47. Conduit 55 extended into the top of 48 a distance of one inch and the center line of 55 was laterally displaced from the center line of 47 and 49 by a distance of 8 inches. Conduits 47, 49 and 55 were all 3", schedule 40 pipe. Conduit 49 was 5 feet long and conduit 55 was 40 feet long.

The material dried in this drier was adsorbent bauxite ranging from 30 to 60 mesh by Tyler standard screen analysis. Three tons per hour of this bauxite, on a dry basis, were charged to vessel 38 through conduit 37. This bauxite contained from 1200 to 2100 pounds of naphtha per ton of bauxite. Steam was used as the inert fluidizing gas and a steam pressure of 3.0 p. s. i. gage was maintained in plenum chamber 75. Steam was admitted to the plenum chamber at the rate of 970 lbs. per hour. The temperature in the fluidized bed was maintained between 400 and 450° F. by means of 600 p. s. i. steam circulated through tubes 80. The pressure in disengaging space 84 was 0.5 p. s. i. gage. Dried contact material was removed to combining chamber 48 at an average rate of 3 tons per hour. The rate in conduit 49 was set by orifice 71 at 4 tons per hour. Thus the rate of circulation through conduit 53, surge pot 54 and conduit 55 was one ton per hour. Flue gas was fed to chamber 48 through pipe 69 at a pressure of about 0.5 p. s. i. gage and a rate of 10 standard cubic feet per hour.

This invention should be understood to cover all changes and modifications of the example of the invention herein chosen for purposes of disclosure which do not constitute departures from the spirit and scope of the invention.

I claim:

1. In a process for treatment of liquid oils with granular adsorbents wherein the adsorbent after contact with the liquid oil is washed with a suitable solvent to effect removal of occluded oil, dried to effect removal of solvent and regenerated by subjection to an oxygen containing gas at elevated temperatures to effect removal of carbonaceous contaminant deposits from the adsorbent, the improved continuous method for drying the adsorbent and transferring the dried adsorbent to the regeneration zone without escape of vapors from the drying zone with the adsorbent, which method comprises, passing adsorbent from the washing zone into a confined drying zone, maintaining a bed of said adsorbent in the drying zone in a state of ebullient motion which resembles a boiling liquid by passing a stream of inert gas upwardly through the bed, flowing a stream of the dried contact material from the surface of said bed in said drying zone into a downwardly extending discharge passage and discharging the adsorbent from the lower end of said discharge passage onto a bed of said adsorbent maintained in a confined combining zone, withdrawing adsorbent from the lower end of said confined combining zone at a location substantially directly below said discharge passage as a confined compact drain stream at a rate above the rate of flow in said discharge passage so that the adsorbent drops freely through the discharge passage, delivering the adsorbent from said compact stream into a confined conveying zone and conveying the adsorbent upwardly to a location above the regeneration zone, flowing a portion of the adsorbent from said last named location downwardly to the regeneration zone and flowing the remainder of the adsorbent downwardly as a confined, compact recycle stream into the upper section of said confined combining zone, discharging the adsorbent from said confined recycle stream onto said bed of adsorbent in said confined combining zone at a location laterally off-set from the location of adsorbent entry into said compact drain stream, the rate of flow from said recycle stream being equal to the difference in rates of flow in said drain stream and said confined passage from said drying zone whereby said bed is constantly maintained, and introducing an inert seal gas into said confined combining zone at a pressure slightly in excess of the pressure in the upper section of said drying zone, whereby a portion of said gas passes upwardly through said confined passage to strip vapors from the effluent adsorbent.

2. In a process wherein a spent adsorbent bearing carbonaceous contaminant and vaporizable constituents is dried to remove the vaporizable constituents and then regenerated by burning the contaminant at elevated temperatures, the improved method for transferring adsorbent from the drying zone to the regeneration zone without escape of vapors from the drying zone with the adsorbent which comprises, discharging dried adsorbent downwardly from the drying zone as a continuous, confined discharge stream of freely flowing particles, directing said stream onto a bed of said adsorbent maintained within a confined combining zone, withdrawing adsorbent from a location within the lower section of said confined combining zone substantially directly below said discharge stream as a confined compact drain stream at a rate above the rate of flow of said discharge stream, delivering the adsorbent from said compact stream into a confined conveying zone and conveying the adsorbent upwardly to a location above the regeneration zone, flowing a portion of the adsorbent from said last named location downwardly to the regeneration zone and flowing the remainder of the adsorbent downwardly as a confined compact recycle stream into the upper section of said confined combining zone, discharging the adsorbent from said recycle stream onto said bed of adsorbent in said confined combining zone at a location laterally off-set from the location of adsorbent entry into said compact drain stream, the rate of flow from said recycle stream being equal to the difference in rates of flow in said drain stream and said discharge stream whereby said bed is constantly maintained and introducing an inert seal gas into said confined combining zone at a pressure slightly in excess of the pressure in said drying zone whereby a portion of said gas passes upwardly through said discharge stream to strip effluent vapors from the adsorbent in said discharge stream.

3. In a process wherein a spent adsorbent bearing carbonaceous contaminants and vaporizable hydrocarbon constituents is dried in a confined drying zone by heating while passing an inert gas upwardly through a bed thereof to maintain the bed in a state of ebullient motion which resembles a boiling fluid, the vaporizable constituents being separately withdrawn from the drying zone, the improved method for transferring the dried adsorbent from said drying zone to a regeneration zone without passage of the vaporized hydrocarbon constituents from the drying zone with the adsorbent and without flooding the drying zone with adsorbent which comprises, flowing the adsorbent from the upper section of said bed in said drying zone downwardly through a confined discharge passage as a confined stream of freely falling particles delivering onto a bed of adsorbent maintained in a confined combining zone therebelow, withdrawing adsorbent from the lower end of said confined combining zone at a location substantially directly below said discharge passage as a confined compact drain stream at a rate above the rate of flow in said discharge passage, delivering the adsorbent from said compact stream into a confined conveying zone and conveying the adsorbent upwardly to a location above the regeneration zone, flowing a portion of the adsorbent from said last named location downwardly to the regeneration zone and flowing the remainder of the adsorbent downwardly as a confined compact recycle stream into the upper section of said confined combining zone, discharging the adsorbent from said recycle stream into the upper section of said confined combining zone at a location laterally off-set from the location of adsorbent entry into said compact drain stream so that an imaginary line connecting the most remote point from said recycle stream of adsorbent entry to said drain stream with the nearest point to said drain stream of adsorbent entry from said recycle stream makes an angle with the horizontal at least equal to the angle of repose of said adsorbent and the rate of flow of said recycle stream being equal to the difference in rates of flow in said drain stream and said discharge stream whereby said bed in said confined combining zone is constantly maintained and introducing inert seal gas into said confined combining zone at a pressure slightly greater than the pressure in the upper section of said drying zone whereby a portion of said gas passes upwardly through said confined passage.

4. In a process wherein a spent adsorbent bearing carbonaceous contaminant and vaporizable constituents is dried to remove the vaporizable constituents and then regenerated by burning the contaminant at elevated temperatures, the improved method for transferring adsorbent from the drying zone to the regeneration zone without escape of vapors from the drying zone with the adsorbent which comprises, discharging dried adsorbent downwardly from the drying zone as a continuous confined discharge stream of freely falling particles onto a bed of said adsorbent maintained within a confined combining zone, withdrawing adsorbent from a location within the lower section of said confined combining zone directly below said discharge stream as a confined compact drain stream at a rate above the rate of flow of said discharge stream, delivering the adsorbent from said drain stream into a confined conveying zone and conveying the adsorbent upwardly to a location above the regeneration zone, flowing a portion of the adsorbent from said last named location downwardly to the regeneration zone, and flowing the remainder of the adsorbent downwardly as a confined recycle stream into the upper section of said confined combining zone, discharging the adsorbent from said recycle stream onto said bed in said confined combining zone at a location laterally off-set and above the location of adsorbent entry to said drain stream so that an imaginary line connecting the nearest point of said recycle stream to said drain stream with the most remote point of said drain stream entry from said recycle stream makes an angle with the horizontal at least equal to the angle of repose of the adsorbent and an imaginary line joining the nearest points of said drain stream and said recycle stream makes an angle with the horizontal slightly in excess of the angle of internal flow of the adsorbent, the rate of flow from said recycle stream being equal to the difference in rates of flow in said drain stream and said discharge stream, and introducing an inert seal gas into said confined combining zone at a pressure slightly in excess of the pressure in said drying zone whereby a portion of said seal gas passes upwardly through said discharge stream to strip effluent vapors from the adsorbent in said discharge stream.

5. In a process wherein a spent adsorbent bearing carbonaceous contaminant and vaporizable constituents is dried to remove the vaporizable constituents and then regenerated by burning the contaminant at elevated temperatures, the improved method for transferring adsorbent from the drying zone to the regeneration zone without escape of vapors from the drying zone with the adsorbent which comprises: discharging dried adsorbent downwardly from the drying zone as a continuous confined discharge stream of freely flowing particles, directing the discharge stream onto the surface of a bed of said adsorbent maintained within a confined combining zone, withdrawing adsorbent from a location within the lower section of said confined combining zone substantially directly below said discharge stream as a confined compact drain stream, throttling the flow of said compact drain stream by means of a fixed throttle to a rate greater than the rate of flow of said discharge stream, delivering said compact drain stream into a confined conveying zone and conveying the adsorbent upwardly to a location above the regeneration zone, flowing a portion of the adsorbent from said last named location downwardly to the regeneration zone and flowing the remainder of the adsorbent downwardly as a confined compact recycle stream into the upper section of said confined combining zone, discharging the adsorbent from said recycle stream onto said bed of adsorbent in said confined combining zone at a location laterally off-set from the location of adsorbent entry into said compact drain stream, the rate of flow from said recycle stream being equal to the difference in rates of flow in said drain stream and said discharge stream whereby said bed is constantly maintained, introducing an inert gas into said confined combining zone at a pressure slightly in excess of the pressure in said drying zone, passing a portion of said gas upwardly through said discharge stream to strip effluent vapors from the adsorbent in the discharge stream, passing a second portion of said gas downwardly with said drain stream, and by-passing part of said second portion from the upstream side of said throttle in said discharge stream to the downstream side of said throttle to equalize the pressure across said throttle.

6. In a process wherein a spent adsorbent bearing carbonaceous contaminant and vaporizable constituents is dried to remove the vaporizable constituents and then regenerated by burning the contaminant at elevated temperatures, the improved method for transferring adsorbent from the drying zone to the regeneration zone without escape of vapors from the drying zone with the adsorbent which comprises: discharging dried adsorbent downwardly from the drying zone as a continuous confined discharge stream of freely flowing particles, directing the discharge stream onto the surface of a bed of said adsorbent maintained within a confined combining zone, withdrawing adsorbent from a location within the lower section of said confined combining zone substantially directly below said discharge stream as a confined compact drain stream at a rate above the rate of flow of said discharge stream, delivering the adsorbent from said compact stream into a confined conveying zone and conveying the adsorbent upwardly to a location above the regeneration zone, flowing a portion of the adsorbent from said last named location downwardly to the regeneration zone and flowing the remainder of the adsorbent downwardly onto the upper section of a confined surge zone at a location above said confined combining zone, flowing adsorbent from said surge zone as a confined compact recycle stream into said confined combining zone, discharging the adsorbent from said recycle stream onto said bed in said confined combining zone at a location laterally off-set from the location of adsorbent entry into said compact drain stream, the rate of flow from said recycle stream being equal to the difference in rates of flow in said drain stream and said discharge stream whereby said bed is constantly maintained, introducing an inert seal gas into said confined combining zone at a pressure slightly in excess of the pressure in said drying zone whereby a portion of said gas passes upwardly through said discharge stream to strip effluent vapors from the adsorbent in said discharge stream and introducing an inert seal gas into the upper section of said recycle stream at a pressure greater than the pressure in said confined combining zone whereby a portion of said seal gas passes downwardly with the recycle stream into said confined combining zone.

7. In a process for treatment of liquid oils with granular adsorbent wherein the adsorbent after contact with the liquid oil is washed with a suitable solvent to effect removal of occluded oil, dried to effect removal of solvent and regenerated by subjection to an oxygen containing gas at elevated temperatures to effect removal of carbonaceous contaminant deposits from the adsorbent, the improved continuous method for drying the adsorbent and transferring the dried adsorbent to the regeneration zone without escape of vapors from the drying zone with the adsorbent, which method comprises, passing adsorbent from the washing zone into a confined drying zone, maintaining a bed of said adsorbent in the drying zone in a state of ebullient motion which resembles a boiling liquid by passing a stream of inert gas upwardly through the bed, flowing a stream of the dried contact material from the surface of said bed in said drying zone into a downwardly extending discharge passage and discharging the adsorbent from the lower end of said discharge passage onto a bed of said adsorbent maintained in a confined combining zone, withdrawing adsorbent from the lower end of said confined combining zone at a location substantially directly below said discharge passage as a confined compact drain stream, throttling the flow in said drain stream near the lower end of said drain stream by means of a fixed throttle to a rate greater than the rate of flow in said discharge passage, delivering the adsorbent from said drain stream into a confined conveying zone and conveying the adsorbent upwardly to a location above the regeneration zone, flowing a portion of the adsorbent from said last named location downwardly to the regeneration zone and flowing the remainder of the adsorbent from said last named location downwardly into the upper section of a confined surge zone maintained above said confined combining zone, passing adsorbent from the lower section of said surge zone as a confined compact recycle stream into the upper section of said confined combining zone, discharging the adsorbent from said recycle stream onto said bed in said confined combining zone at a location above and laterally off-set from the location of adsorbent entry to said drain stream so that an imaginary line connecting the nearest point of said recycle stream to said drain stream with the most remote point of said drain stream entry from said recycle stream makes an angle with the horizontal greater than the angle of repose of the adsorbent and an imaginary line joining the nearest points of said drain stream and said recycle stream makes an angle slightly in excess of the angle of internal flow of the adsorbent, the rate of flow of said recycle stream being equal to the difference in rates of flow in said drain stream and said discharge passage, introducing an inert seal gas into said confined combining zone at a pressure slightly in excess of the pressure in said drying zone whereby a portion of said seal gas passes upwardly through said discharge passage to strip effluent vapors from the adsorbent in said passage and a second portion of said gas passes downwardly with said drain stream, by-passing part of said second portion from a location immediately on the upstream side of said throttle to the lower section of said conveying zone to equalize the gaseous pressure across the throttle, and introducing inert seal gas into the upper section of said recycle stream at a pressure slightly in excess of the pressure in said confined combining zone whereby a portion of said seal gas flows downwardly with said recycle stream into said confined combining zone.

8. A drier for granular contact material which comprises in combination: an enclosed drying vessel, means for supplying heat to the lower section of said vessel, means for introducing inert gas into the lower section of said vessel, means for supplying granular contact material to said vessel, a conduit for the removal of vapors extending from the upper section of said vessel, a confined combining chamber, means defining a passageway for dried contact material from said drying vessel into the upper section of said combining chamber, contact material elevating means extending upwardly to a level above said combining chamber, passage defining means from the lower section of said combining chamber to the lower section of said elevating means, the point of entry of said last named passage defining means to the combining chamber being substantially directly below the point of entry to the combining chamber of said passage defining means from said drying zone, flow rate control means in said last named passage defining means, a supply chamber above said combining chamber, passage defining means from the upper section of said elevating means to the upper section of said supply chamber, passage defining means from the lower section of said supply chamber to a confined regeneration chamber, and passage defining means from the lower section of said supply chamber to the upper section of said combining chamber, the point of entry of said last named passage defining means to said combining chamber being laterally off-set from the point of entry to said combining chamber of said passage defining means extending from the lower section of said combining chamber to the lower section of said elevating means.

9. A drier for removing vaporizable material from granular adsorbent contact material containing carbonaceous contaminants and vaporizable material which comprises in combination: an enclosed drying vessel, means for supplying heat to said vessel to vaporize the vaporizable material, means for removing the vaporized material separately of the adsorbent from the drying chamber, passage defining means for dried contact material extending from said drying chamber downwardly into the upper section of an enclosed combining chamber, means for conveying contact material to a level above said combining chamber, a withdrawal conduit extending from the lower section of said combining chamber at a point substantially directly below the point of entry of said last named passage defining means to said combining chamber and connecting into the lower section of said conveying means, the length of said conduit being sufficient to provide a seal column of substantially compact contact material adequate for preventing the escape of excess gaseous material from said combining chamber to said conveying means, a supply chamber for contact material above said combining chamber, passage defining means from the upper section of said conveying means to said supply zone, a first conduit connecting the bottom of said supply chamber with a regeneration chamber suitable to remove the carbonaceous contaminant from the adsorbent, a second conduit connecting the bottom of said supply chamber with said combining chamber, the discharge end of said second conduit into said combining chamber being located laterally displaced from the withdrawal end of said withdrawal conduit in said combining chamber so that an imaginary line connecting the nearest point of the discharge end of said second conduit with the most remote point of said withdrawal end of said withdrawal conduit makes an angle of at least 30 degrees with the horizontal.

10. A drier for continuously drying wet granular adsorbent which contains a carbonaceous contaminant deposit and vaporizable material which comprises in combination: an enclosed drying chamber, heat transfer tubes throughout the lower section of said drying chamber, means for supplying hot heat transfer fluid to one end of said tubes and means for removing cooled heat transfer fluid from the opposite end of said tubes, means for introducing an inert stripping gas into the lower section of drying chamber, means for removing stripping gas separately of the adsorbent from the upper section of said drying chamber, means for supplying wet granular adsorbent to the upper section of said drying chamber, an enclosed combining chamber at a level below the top of said heat transfer tubes, a discharge conduit for dried contact material extending from the upper section of said drying chamber downwardly into the upper section of said combining chamber, means for introducing inert purge gas into said combining chamber, means for elevating contact material from a level substantially below said combining chamber to a level substantially above said combining chamber, a withdrawal conduit from the bottom of said combining chamber to the bottom of said elevating means, the withdrawal aperture of said last named conduit in said combining chamber being substantially directly below the discharge aperture of said discharge conduit in said combining chamber and the length of said last named conduit being sufficient to provide a seal column of contact material adequate to prevent any substantial transfer of gaseous material through the conduit, a supply chamber above said combining chamber, means defining a passageway connecting the upper end of said elevating means with the upper end of said supply chamber, a conduit connecting the lower end of said supply chamber with a confined regeneration chamber, means defining a recycle passageway connecting the lower section of said supply chamber with the upper section of said combining chamber, the discharge aperture of said recycle passageway in the combining chamber being laterally displaced from the withdrawal aperture of said withdrawal conduit so that an imaginary line connecting nearest point of the discharge end of said recycle conduit with the most remote point of the withdrawal end of said withdrawal conduit makes an angle with the horizontal greater than about 30 degrees and an imaginary line connecting the nearest points on the discharge end of said recycle conduit and the withdrawal end of said withdrawal conduit makes an angle with the horizontal greater than about 75 degrees.

11. A drier for continuously drying wet granular adsorbent which contains a carbonaceous contaminant deposit and vaporizable material which comprises in combination: an enclosed drying chamber, heat transfer tubes throughout the lower section of said drying chamber, means for supplying hot heat transfer fluid to one end of said tubes and means for removing cooled heat transfer fluid from the opposite end of said tubes, means for introducing an inert stripping gas into the lower section of drying chamber, means for removing stripping gas separately of the adsorbent from the upper section of said drying chamber, means for supplying wet granular adsorbent to the upper section of said drying chamber, an enclosed combining chamber at a level below the top of said heat transfer tubes, a discharge conduit for dried contact material extending from the upper section of said drying chamber downwardly into the upper section of said combining chamber, means for introducing inert purge gas into said combining chamber, means for elevating contact material from a level substantially below said combining chamber to a level substantially above said combining chamber, a withdrawal conduit from the bottom of said combining chamber to the bottom of said elevating means, the withdrawal aperture of said last named conduit in said combining chamber being substantially directly below the discharge aperture of said discharge conduit in said combining chamber and the length of said last named conduit being sufficient to provide a seal column of contact material adequate to prevent any substantial transfer of gaseous material through the conduit, an orifice plate with orifice therethrough in the lower section of said last named conduit, a purge gas by-pass pipe extending from said last named conduit at a level above said orifice plate into said elevating means, a supply chamber above said combining chamber, a conduit connecting the upper end of said elevating means with the upper section of said supply chamber, a first conduit connecting the lower section of said supply chamber with the upper section of a confined regeneration chamber therebelow, a second conduit extending downwardly from the lower section of said supply chamber into the upper section of a surge pot maintained at a level intermediate the supply chamber and the combining chamber, a recycle conduit extending from the lower section of said surge pot into the upper section of said combining chamber, the discharge aperture of said recycle conduit being above and laterally displaced from the withdrawal aperture of said withdrawal conduit in said combining chamber so that an imaginary line connecting the nearest point on the discharge end of the recycle conduit with the most remote point of the withdrawal end of said withdrawal conduit with the combining chamber makes an angle with the horizontal greater than 30 degrees and the nearest points on the discharge end of the recycle conduit and the withdrawal end of the withdrawal conduit makes an angle greater than 75 degrees with the horizontal, and means for introducing inert purge gas into the upper section of said recycle conduit.

References Cited in the file of this patent
UNITED STATES PATENTS

| | | |
|---|---|---|
| 1,799,858 | Miller | Apr. 7, 1931 |
| 2,475,984 | Owen | July 12, 1949 |
| 2,522,704 | De Laval | Sept. 19, 1950 |
| 2,534,051 | Nelson | Dec. 12, 1950 |
| 2,572,433 | Bergstrom et al. | Oct. 23, 1951 |